April 10, 1945.  E. W. WELP  2,373,154
LIQUID TREATMENT
Filed Feb. 19, 1942   2 Sheets-Sheet 1

INVENTOR.
Edward W. Welp
BY
Frank D. Prager
ATTORNEY.

April 10, 1945.  E. W. WELP  2,373,154
LIQUID TREATMENT
Filed Feb. 19, 1942  2 Sheets-Sheet 2
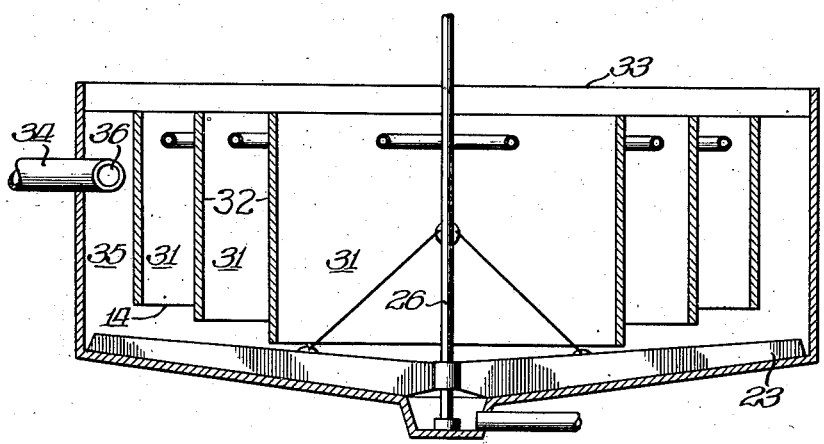
INVENTOR.
Edward W. Welp
BY
Frank D. Prager
ATTORNEY.

Patented Apr. 10, 1945

2,373,154

UNITED STATES PATENT OFFICE 2,373,154

LIQUID TREATMENT

Edward W. Welp, Chicago, Ill., assignor to Graver Tank & Mfg. Co., Inc., a corporation of Delaware Application February 19, 1942, Serial No. 431,478

9 Claims. (Cl. 210—55)

This invention relates to liquid treatment and particularly to clarification with sludge filtration. It is applicable to the clarification of water or sewage, or of other liquids containing solid matter in small concentration. The softening of water is typical for many applications of the invention, and special reference will be had to this application, which illustrates the invention, but is not intended to limit the same.

It is an object of this invention to provide improved ways of sludge filtration.

Another object is to distribute the liquid to be exposed to sludge filtration, especially in large tanks.

Another object is to suitably install and operate flow distributing baffles and compartments in a tank for sludge filtration and clarification.

Other objects are: to provide an improved system of concentric, vertical baffles for such purposes; to maintain a proper inward flow below such baffles, and upward flows between the same; so to space the baffles from the tank bottom, and from one another, as to attain uniform velocities and distribution of liquid and sludge between the several baffles; to withdraw predetermined amounts of treated liquid from between each pair of baffles; to limit the amount of material needed for such baffles; to provide a liquid circulation which assists in maintaining desirable liquid distribution, aside from other advantages; to operate sludge impellers under the baffles so as to maintain proper distribution of sludge deposits and suspended sludge blankets; and to provide various combinations of such features.

Another object is to provide a quiescent clarifying tank incorporating some or all of the aforementioned features, whereby results closely approaching those of intensified sludge filtration may be provided.

Still other objects will appear on consideration of this disclosure.

In the drawings:

Figure 3 is a similar view of apparatus incorporating other modifications.

Figure 1:
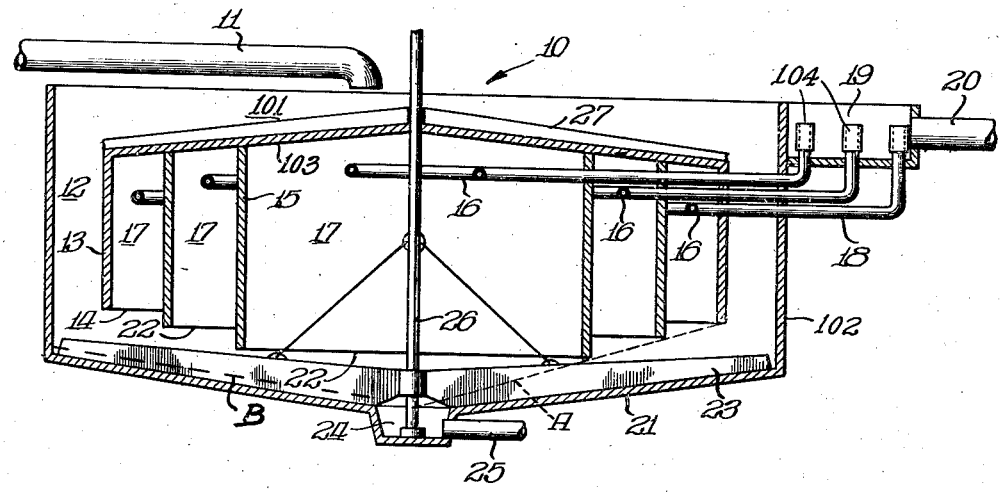
Figure 1 is a sectional elevation of apparatus constructed according to this invention.

The circular tank 10 receives the hard water mixed with softening reagents through a conduit 11 discharging into the upper central part 101 of the tank. Upon arriving there, the water is distributed outwardly and then flows downwardly in a primary zone of coagulation and partial sedimentation, designated by numeral 12. This zone is confined between the wall 102 of the tank and the outside of an annular partition 13, which is installed concentrically with the tank, and extends from above the tank bottom to below the liquid level in the tank. The top of this annular partition is closed by a tray 103. The partition and the tray form together a submerged bell, which extends vertically through the greatest part of the depth of the tank.

A large number of precipitates of hardness forming constituents are formed and gradually built up, in this primary flow, and are present in the water when the flow reaches the lower edge 14 of the depending spirt or partition of the bell. At this point, some of the precipitates have already reached the condition of large and heavy flocs, which tend to settle rapidly and which on the other hand cannot be easily enlarged any more under the conditions of the process, for which reason they can be considered spent sludge rather than material useful for sludge filtration. At the same point the water also contains a considerable amount of solids which are yet in the process of consolidating into flocs of solid aggregate condition. Finally, this water carries solids of intermediate size, completeness, weight, and settling characteristics. The latter type of solids, or flocs, are both used and treated with advantage, in the sludge filtration which occurs in the flow past the edge 14 of the bell 13.

A sludge bed of such particles of intermediate weight is easily disturbed, with resultant loss of floc material, turbidity of the effluent, and other objectionable results. Especially in tanks having a large bottom area there is a tendency for the flow to pass through a small part of the tank space in form of a solid stream, rather than to distribute itself over the whole area. An infinite number of small streams properly distributed maintains uniform conditions in the sludge bed; whereas a solid stream passing through a localized zone prevents the carrying out of proper sludge filtration.

The tanks shown herein have a large bottom area; they are considerably wider than deep. Therefore, I have to provide against localized flows as mentioned. I provide, on the inside of the bell 13, one or more cylindrical partition plates 15 concentric with the bell and downwardly extending from the top 103 of the same. Each pair of partitions defines a chamber 17 between the same. Individual draw-off means 16 for softened water are installed in the several chambers. These plates 15 like the outer bell 13 form partial partitions of the tank, in that they do not reach all the way to the bottom of the tank.

The greater the number of such upflow chambers is, the closer is the approximation to the ideal condition wherein an infinite number of small streams is present. However, too great a number of partitions would also induce excessive surface friction; the cost of material would be high; and other disadvantages would be encountered. Therefore I generally space the partitions so as to provide chambers having flow areas of about 200 to 500 square feet, or sometimes even greater areas.

Preferably the several chambers have identical amounts of flow which pass upwardly from the lower part of the tank to the respective take-off members 16. Identical amounts of softened water are then withdrawn from the several take-off members, by effluent pipes 18 having approximately uniform liquid carrying capacity and discharging into a common overflow box 19. Each pipe may have individual flow controlling means 104, of known construction, in the overflow box. An effluent header 20 leads from this box to the point of service or storage.

The bottom 21 of the treatment zone in the tank may be perfectly flat, or may be flat with slight outward or inward inclination. In some instances it may be a false bottom, with a sludge compartment or the like below the same. Since large tanks are primarily contemplated and simplicity of sludge removal and occasional draining of the tank are important, I will generally have a true, solid bottom shaped like a flat inverted cone, having considerable horizontal extension and an inward slope of about 5%, more or less. With such a bottom, I generally provide parallel flow of water and spent sludge, in identical directions. In some instances, however, I may provide what is known as countercurrent sludge filtration; or the sludge may be removed transversely of the liquid flow lines.

In operation, there is primary softening treatment in the chamber 12, followed by an inward flow of liquid and flocs over the bottom 21. It is generally desirable to have at least approximately uniform velocities in this inward flow, so that a uniform balance may be kept between settling and re-suspending tendencies in the sludge which is present in the lower part of the tank. Accordingly, the lower edges 22 of the partitions 15 are horizontal, and are so spaced from the bottom 21 that the inward flow may have approximately uniform velocity, considering the fact that ordinarily, successive and identical amounts of liquid and flocs are branched off into successive and concentric compartments 17. If these compartments have annular, circular shape and identical area, the inward flow must taper towards the center, and the edges 22 must intersect a straight line A between the center of the bottom 21 and the outermost edge 14, in order to strictly comply with the requirements stated. However, considerable latitude is permissible in this respect. The lower limit of the inward flow is actually defined by the upper surface B of the settled sludge, which may form a layer of several inches, or at least fractional inches thickness over the bottom 21. Slight differences in flow velocity are unavoidable, and are permissible as long as there is no undue resuspension of settled spent sludge.

The sludge accumulating over the bottom 21 includes both heavy spent sludge and lighter unspent sludge. In proper operation the light, unspent, and active sludge is kept suspended, and largely accumulated, by the inward and subsequent upward flows, and uniform conditions in this active sludge accumulation are enforced by the distribution of upward flows between the partitions 15. The spent and settled sludge is not, in normal operation, appreciably disturbed by the flow, but is removed from the bottom by rotating sludge impellers 23, and is ultimately scraped into a central sludge disposal hopper 24 and removed from the tank by a sludge pipe 25.

The sludge impeller 23 is slowly actuated by a power-driven shaft 26. This shaft may also rotate a sludge impeller 27 outwardly removing sludge particles from the top of the bell 13 and thereby promoting coagulation in the primary zone 12. Both sets of sludge impellers, on the bell 13 and bottom 21, are generally in the nature of scraping members, moving only a few inches, or fractional inches, per second. For some applications or at some times it may be desirable to have relatively fast motion of the liquid. However, there are distinct limitations of speed for long radial sludge impelling blades, beyond which an increase of speed is wasteful of power, or objectionable due to differential liquid velocities in the center and at the periphery. At the slow speed mentioned, no such objections can be raised. Accordingly, I rely largely on the velocity of the liquid itself to provide sludge suspension, or agitation, where such functions are desired.

It is relatively easy to operate the tank as a clarifier and to obtain very good results. The space within the bell 13, wherein the finest sludge is removed by subsidence, is efficiently protected from any convection currents and eddies. The whole of the area and volume of this space is positively and uniformly utilized for liquid clarification by providing the partitions 15 and individual chambers 17.

It is not quite so easy, but entirely possible with careful operation, to obtain appreciably improved results by filtration through a deep and concentrated sludge blanket. This process cannot be started at once when the tank goes into operation, but requires the building up of a supply of sludge. Even this supply will not immediately be available for best results, since it will at the beginning contain a high percentage of relatively spent sludge.

In order to start this process with sludge filtration, I admit a slow throughput flow mixed with softening reagents, and I may add some coagulating reagents. I allow the small incipient flocs to accumulate on the bottom 21; that is, I do not in the beginning withdraw any sludge through the pipe 25, and I merely use the scraper 23 to evenly distribute the sludge over the bottom, discouraging any tendency of the sludge to pile up in certain zones of the bottom. After a time of such operation, I reach the point where the sludge accumulated on the bottom 21 and distributed over the same sufficiently restricts the flow area between the bottom and the lower edges 22 to cause some of the sludge to be resuspended in the chambers 17. I allow this to occur, whereby incipient sludge blankets are built up. Such incipient blankets are very mobile and poorly delimited; and for a time I may have to withdraw water with small flocs therein through the take-off pipes 16. However, the sludge particles grow heavier, in the average. After a time, I am able to prevent an appreciable building up of the sludge blankets above a predetermined, allowable level below the take-off points 16. In order to observe the level of the sludge blanket, I may provide suitable sampling lines. After the allowable sludge level has been reached, I start to withdraw some of the sludge through the pipe 25, in manner to maintain the desirable accumulation of sludge in the tank, but gradually to remove the heavy, spent sludge from the tank, and mainly to retain the relatively light and active sludge. Throughout this time I operate the scraper 23 so as to maintain even distribution of the sludge over the bottom 21. This may involve periods of rotating the scrapers in one direction and at one speed; it may also involve changes of speed, changes of direction, and periods of rest. Once a certain equilibrium has been established, the operation is such that in principle, I maintain the rotation of the scrapers 23 at a certain speed and direction, constantly withdrawing the heavy, spent material and maintaining the necessary accumulation of active sludge in the tank. For some time the weight of individual sludge particles and the concentration of solids in the chambers 17 tends to increase further; and gradually there is developed a well delimited sludge blanket, with a flat upper surface. As this occurs I may increase the amount and velocity of throughput, which of course tends to suspend more sludge and requires proper precaution to still control the sludge level. The feed of chemicals will generally be proportionally increased. At about the same time I have to start withdrawing sludge at the same rate that new sludge material is brought into the tank by the throughput flow. When this has gone on for some time, a minimum of spent sludge remains on the tank bottom, while deep and concentrated beds of active sludge in suspension are retained in the chambers 17. This marks the beginning of normal operation.

Thereafter, throughput flow and sludge removal are maintained in substantially the same manner, throughout the normal operation, as established upon the last mentioned increase of flow rates. However, many disturbing factors may be met, such as changes of bicarbonates, sulphates or other substances in the water, changes of pH, temperature, and the like. Any such change tends to upset the conditions in the tank, and therefore, careful attention must be paid to the process, and adjustments of chemical dosage, sludge removal, liquid flow rates, or other functions may be necessary from time to time.

The inward flow of the water under treatment, over the bottom 21, may require at least a few minutes to pass from the outer edge 14 of the bell 13 to the inner-most chamber 17. During this time, the treatment proceeds. Therefore, the sludge particles in the inner-most chamber 17 will generally be larger, heavier, more settleable, and closer to spent conditions than those in the outer compartments 17. In upward filtration through particles of different settleability, wherein at least some of the particles are suspended by the upward flow, there is a tendency for the lightest particles to be spaced considerably from one another, while heavier ones remain relatively packed. This, of course, depends on a number of variable factors, and no general rule can be stated. In some instances, however, conditions may be encountered in which the flow through the inner chambers must be more rapid, to insure best results of the treatment, in view of the differences of sludge material between the several chambers 17. In order to provide said more rapid flow said inner compartments 17 must have smaller area than the outer compartments 17, when treating equal amounts of water; more generally, the amount of throughput flow in each compartment, divided by the area thereof, must be greater than in the next surrounding compartment, in approximate proportion to the inwardly increasing settleability of the sludge.

Figure 2:
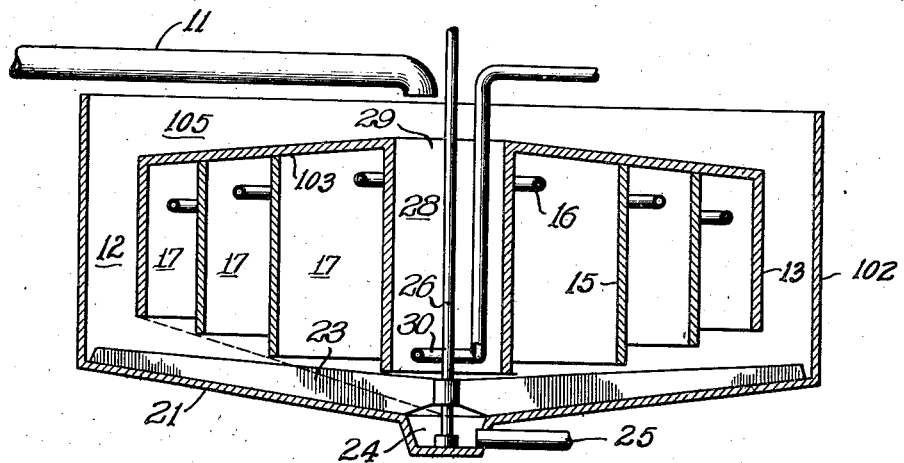
Figure 2 is a similar view of apparatus which is modified in some respects.

It is possible to set up a closed circulation which causes more uniform conditions in the several chambers regardless of area and throughput, aside from other advantages. For this purpose, Figure 2 shows a central mixing chamber 28 which is not provided with effluent take-offs 16. This central chamber receives the remainder of the inward flow not withdrawn through the upflow chambers 17, and communicates with the primary chamber 12 through a top opening 29 discharging into the outward transfer zone or duct 105 above the top plate 103. A forced and accelerated upward flow of the water and sludge is caused in the central chamber by means of a distributor 30 for compressed air, or other well-known means. This flow is mixed with the incoming flow adjacent to the opening 29; it is then returned to the space below the chambers 17, and forms part of the inward flow again, returning solids from the inner-most chambers 17 to the outer-most chambers 17.

The apparatus of Figure 3 eliminates the top plate of the bell 13 and provides chambers 31 which are open on top and separated by concentric, annular partitions 32, supported by a superstructure 33. In this embodiment the partitions 32 extend from their bottom edges 14 at least to the level of the several clear-liquid draw-off means, and preferably above the same, as shown. The incoming liquid feed pipe 34 enters the peripheral, primary chamber 35 through one or several tangential inlets 36; or there may be some other means to peripherally distribute the water. The top scrapers 27 are dispensed with, but in some cases a skimming device may operate in the top of the tank. The flow in the tank will be spiral, but excessive rotation can be stilled by vertical baffles, well known to the art.

Various combinations can be formed, for instance between the features of Figures 2 and 3; and other modifications will occur to persons skilled in the art.

I claim:

1. In liquid treatment apparatus, a tank, which is considerably wider than deep, a substantially flat bottom and substantially vertical walls in said tank, a plurality of annular partitions concentric with said tank, each of said partitions upwardly extending from above said bottom through the greatest part of the depth of said tank, whereby there is formed in said tank an outermost downflow zone and a plurality of inner upflow zones, means adapted to supply liquid to be clarified and any reagents for the precipitation of sludge to an upper part of said downflow zone, means adapted to withdraw controlled amounts of treated liquid from an upper part of each of said upflow zones, a sludge scraper adapted to collect settled sludge from various points of said bottom to localized points thereof, and sludge withdrawal means adjacent said localized points.

2. Apparatus according to claim 1 wherein said annular partitions are so spaced from one another, and said means to withdraw controlled amounts of liquid are so constructed that the amounts of liquid withdrawn, divided by the area of the upflow zone, is approximately the same in each of said upflow zones.

3. Apparatus according to claim 1 wherein said annular partitions are so spaced from one another, and said means to withdraw controlled amounts of liquid are so constructed that the amounts of liquid withdrawn, divided by the area of the upflow zone, is slightly greater in each inner upflow zone than in the preceding outer upflow zone.

4. Apparatus according to claim 1, wherein said annular partitions extend upwardly from points which are closer to said bottom for each inner partition than for the preceding outer partition.

5. In liquid treatment apparatus, a tank which is considerably wider than deep, a substantially flat bottom and substantially vertical walls in said tank, a plurality of annular partitions concentric with said tank, each of said partitions extending upwardly from above said bottom through the greatest part of the depth of said tank, whereby there is formed in said tank an outermost downflow zone, a plurality of inner upflow clarification zones, and an innermost upflow mixing zone, transfer means between the top of said mixing zone and the top of said downflow zone for conveying all the liquid issuing from said mixing zone to said downflow zone, means adapted to supply liquid to be clarified to said tank adjacent the top of said mixing zone, means adapted to withdraw treated liquid from upper parts of said clarification zones, means adapted to circulate liquid and sludge upwardly through said mixing zone, outwardly through said transfer means, downwardly through said downflow zone, and inwardly through the tank below said partitions, a sludge scraper adapted to collect settled sludge from various points of said bottom to localized points thereof, and sludge withdrawal means adjacent said localized points.

6. Apparatus according to claim 5 wherein said means to circulate liquid and sludge comprises an airlift in said mixing zone.

7. A process for liquid treatment by the formation and removal of sludge in a liquid body maintained in a tank, said liquid body being substantially divided into an outer downflow zone and an inner, larger zone by a partial partition concentric with said tank, and said inner zone being substantially subdivided into a plurality of upflow zones by additional, concentric, partial partition means, which process comprises the steps of passing liquid to be treated and any reagents for precipitating a sludge into an upper part of said outer downflow zone and downwardly through said downflow zone, substantially uniformly distributing the liquid over the lower parts of said upflow zones, upwardly displacing the liquid through said upflow zones, removing treated liquid from the upper parts of said upflow zones, and removing precipitated sludge from the lower parts of said upflow zones.

8. Process according to claim 7 wherein the liquid is distributed over the lower parts of said upflow zones by controlling the amount of liquid removed from the upper part of each upflow zone.

9. Process according to claim 7 wherein the liquid is distributed over the lower parts of said upflow zones by injecting the same into the zone below said additional partial partitions in a rapid inward flow.

EDWARD W. WELP.